US012755179B2

(12) United States Patent
Kollias et al.

(10) Patent No.: US 12,755,179 B2
(45) Date of Patent: Oct. 6, 2026

(54) QUANTUM GRAPH TRANSFORMERS

(71) Applicant: International Business Machines Corporation, Armonk, NY (US)

(72) Inventors: Georgios Kollias, White Plains, NY (US); Vasileios Kalantzis, White Plains, NY (US); Theodoros Salonidis, Wayne, PA (US); Shashanka Ubaru, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 594 days.

(21) Appl. No.: 18/357,259

(22) Filed: Jul. 24, 2023

(65) Prior Publication Data

US 2025/0036987 A1 Jan. 30, 2025

(51) Int. Cl.
*G06N 10/20* (2022.01)

(52) U.S. Cl.
CPC .................................... *G06N 10/20* (2022.01)

(58) Field of Classification Search
CPC ...................................................... G06N 10/20
USPC ............................................................ 706/12
See application file for complete search history.

(56) References Cited

U.S. PATENT DOCUMENTS 9,875,215 B2 1/2018 Macready et al.
2014/0324933 A1 10/2014 Macready et al.
2019/0164059 A1* 5/2019 Denchev ................ G06N 3/126
2022/0405194 A1* 12/2022 Naveh .................... G06N 10/00
2023/0237361 A1* 7/2023 Cowtan .................... G06N 5/01
706/62

FOREIGN PATENT DOCUMENTS

| | | | |
|---|---|---|---|
| CN | 107317676 | A | 11/2017 |
| CN | 114329853 | A | 9/2020 |
| CN | 113159239 | A | 7/2021 |
| CN | 114358291 | A | 4/2022 |
| CN | 115236455 | A | 10/2022 |
| CN | 115238852 | A | 10/2022 |
| CN | 115983391 | A | 4/2023 |

OTHER PUBLICATIONS

Ai, Xing et al. | "Decompositional quantum graph neural network." arXiv preprint arXiv:2201.05158v1 [quant-ph] Jan. 13, 2022, 9 pages.

(Continued)

*Primary Examiner* — Jeffery A Williams
(74) *Attorney, Agent, or Firm* — Amin, Turocy & Watson, LLP

(57) ABSTRACT

Systems and techniques that facilitate quantum graph transformation are provided. For example, one or more embodiments described herein can comprise a system, which can comprise a memory that can store computer executable components. The system can also comprise a processor, operably coupled to the memory that can execute the computer executable components stored in memory. The computer executable components can comprise a quantum graph transformer that learns a quantum encoding of a graph an optimization component that updates parameters of a variational quantum circuit based on a function of measurements over the final quantum state and a supervisory signal.

19 Claims, 14 Drawing Sheets

(56) References Cited

OTHER PUBLICATIONS

Di Sipio, R et al. | "The dawn of quantum natural language processing." In ICASSP 2022-2022 IEEE International Conference on Acoustics, Speech and Signal Processing (ICASSP), arXiv reprint arXiv:2110.06510v1 [cs.CL] Oct. 13, 2021, 6 pages.
Mernyei, P. et al. | "Equivariant quantum graph circuits." In International Conference on Machine Learning, pp. 15401-15420, PMLR, arXiv reprint arXiv:2112.05261v3 [cs.LG] Jun. 13, 2022, 20 pages.
Tang, Ye et al. | "From Quantum Graph Computing to Quantum Graph Learning: A Survey." arXiv preprint arXiv:2202.09506v1 [quant-ph] Feb. 19, 2022, 9 pages.
Verdon, G. et al. | "Quantum graph neural networks." arXiv preprint arXiv:1909.12264v1 [quant-ph] Sep. 26, 2019, 10 pages.
Yang, Ch.-H. et al. | "When BERT meets quantum temporal convolution learning for text classification in heterogeneous computing." In ICASSP 2022-2022 IEEE International Conference on Acoustics, Speech and Signal Processing (ICASSP), arXiv reprint arXiv:2203.03550v1 [cs.CL] Feb. 17, 2022, 5 pages.
Zheng, J. et al. | "Quantum graph convolutional neural networks." In 2021 40th Chinese Control Conference (CCC), arXiv reprint arXiv:2107.03257v1 [eess.SP] Jul. 7, 2021, 7 pages.
Kollias, G. et al. | "Quantum Graph Transformers," ICASSP 2023—2023 IEEE International Conference on Acoustics, Speech and Signal Processing (ICASSP), Rhodes Island, Greece, 2023, pp. 1-5, doi: 10.1109/ICASSP49357.2023.10096345, 5 pages.

* cited by examiner

900

| QPU codename | Initial AP | Learnt AP |
|---|---|---|
| ibm_oslo | 0.624 ± 0.149 | 0.984 ± 0.021 |
| ibm_nairobi | 0.588 ± 0.055 | 0.981 ± 0.019 |
| ibmq_manila | 0.533 ± 0.087 | 0.976 ± 0.023 |
| ibmq_quito | 0.573 ± 0.067 | 0.973 ± 0.020 |
| ibmq_lima | 0.604 ± 0.109 | 0.973 ± 0.017 |

FIG. 9

QUANTUM GRAPH TRANSFORMERS

BACKGROUND

The subject disclosure relates to quantum computing, and more specifically to quantum graph transformers.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices and/or method that facilitate quantum graph transformers are described.

According to an embodiment, a system can comprise a processor that executes computer executable components stored in memory. The computer executable components comprise a quantum graph transformer that learns a quantum encoding of a graph, wherein the learning comprises: generating a quantum graph state from the encoding quantum circuit based on input qubits representing nodes of the graph, wherein the quantum graph state serves as quantum representation of the graph. An advantage of such a system is that it implements the positional encodings utilized in classical graph transformers on quantum hardware.

In some embodiments, the learning further comprises generating a final quantum state and graph encodings from a variational quantum circuit based on the quantum graph state. An advantage of such a system is that it implements the all-to-all connectivity of classical graph transformers on quantum hardware.

According to another embodiment, a computer-implemented method can comprise learning, by a system operatively coupled to a processor, a quantum encoding of a graph, wherein the learning comprises: generating, by the system, a quantum graph state from the encoding quantum circuit based on input qubits representing nodes of the graph, wherein the quantum graph state serves as quantum representation of the graph. An advantage of such a computer-implemented method is that it implements the positional encodings utilized in classical graph transformers on quantum hardware.

In some embodiments, the above computer-implemented method can further comprise generating, by the system, a final quantum state and graph encodings from a variational quantum circuit based on the quantum graph state. An advantage of such a computer-implemented method is that it implements the all-to-all connectivity of classical graph transformers on quantum hardware.

According to another embodiment, a computer program product comprising a computer readable storage medium having program instructions embodied there with, the program instructions executable by a processor to cause the processor to learn, by the processor, a quantum encoding of a graph, wherein the learning causes the processor to: generate, by the processor, a quantum graph state from the encoding quantum circuit based on input qubits representing nodes of the graph, wherein the quantum graph state serves as quantum representation of the graph. An advantage of such a computer program product is that it implements the positional encodings utilized in classical graph transformers on quantum hardware.

In some embodiments, the program instructions are further executable by the processor to cause the processor to generate, by the processor, a final quantum state and graph encodings from a variational quantum circuit based on the quantum graph state. An advantage of such a computer program product is that it implements the all-to-all connectivity of classical graph transformers on quantum hardware.

DESCRIPTION OF THE DRAWINGS

FIG. 9 illustrates a table showing the accuracy of a quantum graph transformer before and after training in accordance with one or more embodiments described herein.

Figure 1:
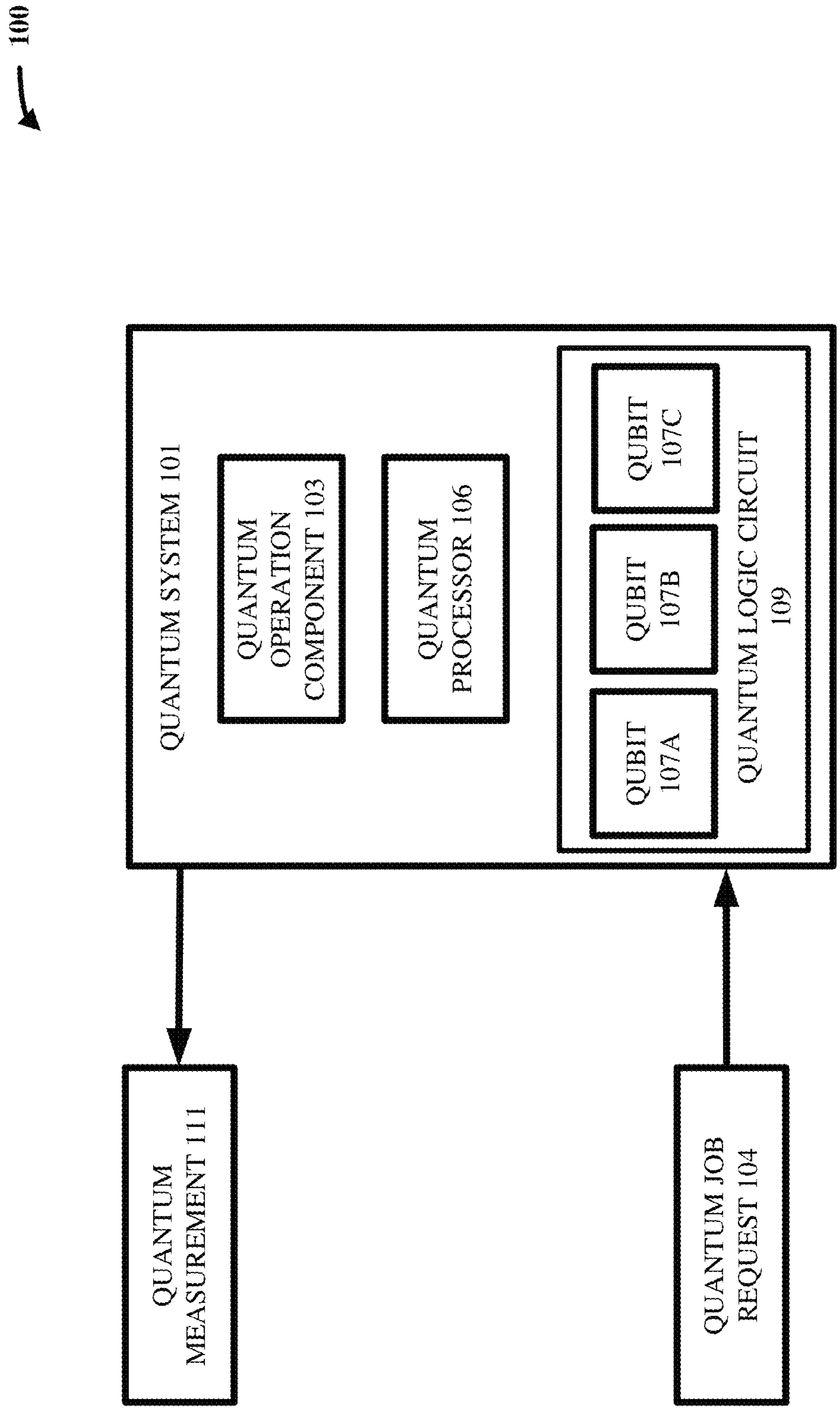
FIG. 1 illustrates a block diagram of an example, non-limiting system that can complete execution of a quantum job in accordance with one or more embodiments described herein.

Appendix A is a detailed paper describing various embodiments and is to be considered part of this patent specification.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

Graphs are ubiquitous and among the most general data structures spanning across a wide variety of application areas. Graph analysis allows for the determination of useful insights and optimizations of the modelled process as well as the organization of connected entities. Accordingly, Graph Artificial Intelligence (AI) has emerged as a subfield of graph analytics to expand learning on graphs using neural network architectures which produce vector representations (embeddings) for vertices, edges and subgraphs. These embeddings can then be utilized for graph analysis tasks, including node classification, link prediction, and graph property estimation. Graph Neural Networks (GNNs) have been at the forefront of these developments by generalizing the idea of message passing, where exchanged messages are representations of graph primitives that are linearly transformed and combined in a non-linear manner. Such transformations are learnt by optimizing a task-dependent objective while messages flow along graph edges. More recently, graph AI has been enriched with Graph Transformers (GTs) that utilize an all-to-all connectivity and can therefore learn hidden links which are not present in the original graph structure.

However, Graph AI has previously been limited to classical computing, and therefore prevented from utilizing the advantages that quantum computing can offer in terms of increased processing power, speed and computational complexity. In order to address this problem, a quantum graph transformer (QGT) is described herein that uses the principles of graph transformers to enable mapping of GT primitives such as message passing and graph encodings to quantum computing primitives and infrastructure. QGT is built on top of a GT architecture and incorporates two circuits which translate the graph structure and model the all-to-all GT attention and message passing mechanisms to quantum computing primitives. More specifically, QGT provides a direct mapping between qubits and graph nodes. The structure of the graph is represented via an encoding diagram circuit which obeys the graph edge connectivity. The state of the qubits is manipulated by a combination of Hadamard and controlled-Z gates. The output quantum graph state serves as the quantum representation of the given graph. All-to-all node interaction with learnable weights for the GT message passing are represented by a variational quantum circuit that connects all possible node pairs. Connection between two nodes is implemented through a controlled-X gate between two qubits. In one or more embodiments, the present disclosure can be implemented in the form of systems, computer-implemented methods, and/or computer program products that can further facilitate quantum graph transformers by generating a quantum graph state from the encoding quantum circuit based on input qubits representing nodes of the graph, wherein the quantum graph state serves as quantum representation of the graph, and generating a final quantum state and graph encodings from a variational quantum circuit based on the quantum graph state.

As referenced herein, an "entity" can comprise a human, a client, a user, a computing device, a software application, an agent, a machine learning (ML) model, an artificial intelligence (AI) model, and/or another entity.

Turning first generally to FIG. 1, one or more embodiments described herein can include one or more devices, systems and/or apparatuses that can facilitate executing one or more quantum operations to facilitate output of one or more quantum results. For example, FIG. 1 illustrates a block diagram of an example, non-limiting system 100 that can complete the execution of a quantum job.

The quantum system 101 (e.g., quantum computer system, superconducting quantum computer system and/or the like) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high level components and/or functions. The quantum circuity can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement 111, can be responsive to the quantum job request 104 and associated input data and can be based at least in part on the input data, quantum functions and/or quantum computations.

In one or more embodiments, the quantum system 101 can comprise one or more quantum components, such as a quantum operation component 103, a quantum processor 106 and a quantum logic circuit 109 comprising one or more qubits (e.g., qubits 107A, 107B and/or 107C), also referred to herein as qubit devices 107A, 107B and 107C. The quantum processor 106 can be any suitable processor, such as being capable of controlling qubit coherence and the like. The quantum processor 106 can generate one or more instructions for controlling the one or more processes of the quantum operation component 103.

The quantum operation component 103 that can obtain (e.g., download, receive, search for and/or the like) a quantum job request 104 requesting execution of one or more quantum programs. The quantum operation component 103 can determine one or more quantum logic circuits, such as the quantum logic circuit 109, for executing the quantum program. The request 104 can be provided in any suitable format, such as a text format, binary format and/or another suitable format. In one or more embodiments, the request 104 can be received by a component other than a component of the quantum system 101, such as a by a component of a classical system coupled to and/or in communication with the quantum system 101.

The quantum operation component 103 can perform one or more quantum processes, calculations and/or measurements for operating one or more quantum circuits on the one or more qubits 107A, 107B and/or 107C. For example, the quantum operation component 103 can operate one or more qubit effectors, such as qubit oscillators, harmonic oscillators, pulse generators and/or the like to cause one or more pulses to stimulate and/or manipulate the state(s) of the one or more qubits 107A, 107B and/or 107C comprised by the quantum system 101. That is, the quantum operation component 103, such as in combination with the quantum processor 106, can execute operation of a quantum logic circuit on one or more qubits of the circuit (e.g., qubit 107A. 107B and/or 107C). The quantum operation component 103 can output one or more quantum job results, such as one or more quantum measurements 111, in response to the quantum job request 104.

It will be appreciated that the following description(s) refer(s) to the operation of a single quantum program from a single quantum job request. However, it also will be appreciated that one or more of the processes described herein can be scalable, such as execution of one or more quantum programs and/or quantum job requests in parallel with one another.

In one or more embodiments, the non-limiting system 100 can be a hybrid system and thus can include both one or more classical systems, such as a quantum program implementation system, and one or more quantum systems, such as the quantum system 101. In one or more other embodiments, the quantum system 101 can be separate from, but function in combination with, a classical system.

In such case, one or more communications between one or more components of the non-limiting system 100 and a classical system can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Figure 2:
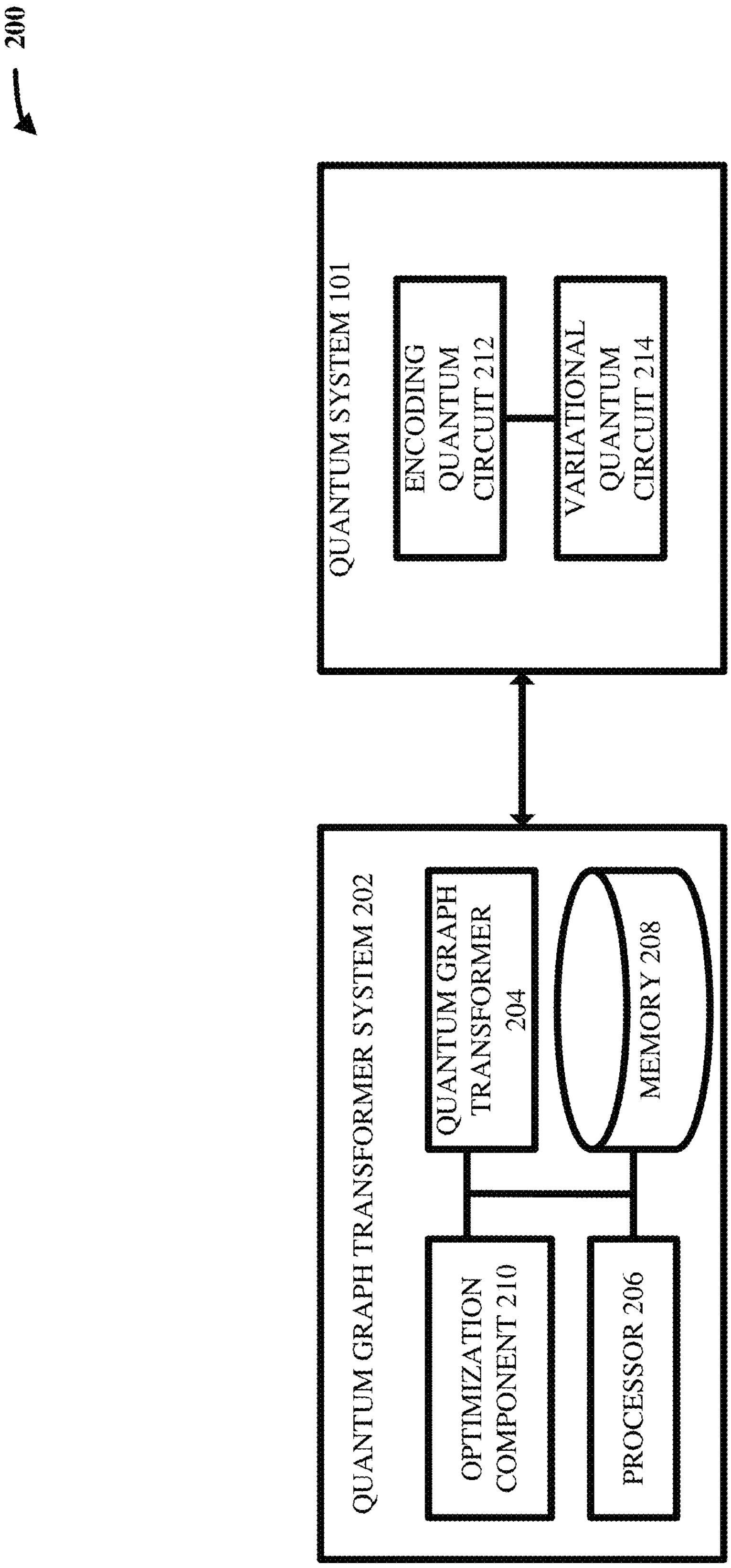
FIG. 2 illustrates a block diagram of an example, non-limiting system that can facilitate quantum graph transformation in accordance with one or more embodiments described herein.

FIG. 2 illustrates block diagram of an example, non-limiting system 200 that can facilitate quantum graph transformation in accordance with one or more embodiments described herein. Aspects of systems (e.g., system 202 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines, e.g., computers, computing devices, virtual machines, etc. can cause the machines to perform the operations described. System 202 can comprise optimization component 210, quantum graph transformer 204, processor 206, memory 208 and quantum system 101.

In various embodiments, quantum graph transformer system 202 can comprise a processor 206 (e.g., a computer processing unit, microprocessor) and a computer-readable memory 208 that is operably connected to the processor 206. The memory 208 can store computer-executable instructions which, upon execution by the processor, can cause the processor 206 and/or other components of the quantum graph transformer system 202 (e.g., optimization component 210, quantum graph transformer 204 and/or quantum system 101) to perform one or more acts. In various embodiments, the memory 208 can store computer-executable components (e.g., optimization component 210 and/or quantum graph transformer 204), the processor 206 can execute the computer-executable components.

According to some embodiments, the quantum graph transformer system 202 and/or quantum graph transformer 204 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the quantum graph transformer system 202 and/or quantum graph transformer 204 can employ principles of probabilistic and decision theoretic inference to determine one or more responses. In various embodiments, the quantum graph transformer system 202 and/or quantum graph transformer 204 can employ a knowledge source database comprising previously synthesized machine learning outputs. Additionally or alternatively, the quantum graph transformer system 202 and/or quantum graph transformer 204 can rely on predictive models constructed using machine learning and/or automated learning procedures. Logic-centric inference can also be employed separately or in conjunction with probabilistic methods. For example, decision tree learning can be utilized to map observations about data retained in a knowledge source database to derive a conclusion as to a response to a question.

As used herein, the term "inference" refers generally to the process of reasoning about or inferring states of the system, a component, a module, the environment, and/or assessments from one or more observations captured through events, reports, data, and/or through other forms of communication. Inference can be employed to identify a specific context or action, or can generate a probability distribution over states, for example. The inference can be probabilistic. For example, computation of a probability distribution over states of interest can be based on a consideration of data and/or events. The inference can also refer to techniques employed for composing higher-level events from one or more events and/or data. Such inference can result in the construction of new events and/or actions from one or more observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects. Furthermore, the inference processes can be based on stochastic or deterministic methods, such as random sampling, Monte Carlo Tree Search, and so on.

The various aspects can employ various artificial intelligence-based schemes for carrying out various aspects thereof. For example, a process for evaluating one or more graphs, without interaction from the target entity, which can be enabled through an automatic classifier system and process.

A classifier is a function that maps an input attribute vector, x=(×1, ×2, ×3, ×4, ×n), to a confidence that the input belongs to a class. In other words, f(x)=confidence(class). Such classification can employ a probabilistic and/or statistical-based analysis (e.g., factoring into the analysis utilities and costs) to prognose or infer an action that should be employed to make a determination.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing and recording target entity behavior, by receiving extrinsic information, and so on). For example, SVM's can be configured through a learning phase or a training phase within a classifier constructor and feature selection module. Thus, a classifier(s) can be used to automatically learn and perform a number of functions, including but not limited to, natural language processing.

In one or more embodiments, quantum graph transformer 204 can learn a quantum encoding of a graph. For example, consider an undirected and unweighted graph G=(V, E) of n nodes, where V={1, . . . , n} denotes the set of vertices and E={(i, j)|i, j∈V} denotes the set of edges, respectively. The connectivity information of G can be represented via an adjacency matrix $A\in\mathbb{R}^{n\times n}$ where $A_{ij}=1$ iff(i, j)∈E, and zero otherwise.

Let now each vertex i of G be associated with an encoding vector $x_i\in\mathbb{R}^d$. Such encodings can be initially constructed by composing embedded graph properties and node feature vectors, and can be organized in a matrix form where $x_i$ denotes the ith row of the encoding matrix $X\in\mathbb{R}^{n\times d}$. The premise behind the quantum graph transformer is to perform all-to-all connectivity between the entities exchanging encodings, the vertices of G. These node encodings are then transformed by a weight matrix, where the individual weight between any pair (i, j) is decided by the similarity of their transformed encodings; a process referred to as attention between nodes i and j. The similarity function is chosen to be a normalized dot product. Thus, the quantum graph transformer adopts the attention head and updates the encodings of each head layer as $$X \leftarrow softmax\left(\frac{Q\cdot K^T}{\sqrt{d}}\right)V \tag{1}$$

where query, key and value vectors are the transformed encoding vectors organized as rows in the respective matrices $Q=XW_Q$, $K=XW_K$, and $V=XW_V$, where the weight matrices $W_Q$, $W_K$, and $W_V$ are learned during training.

A careful look at equation (1) above indicates that graph transformers replace the adjacency matrix A by the dense matrix softmax $$\left(\frac{Q\cdot K^T}{\sqrt{d}}\right).$$

This replacement gives graph transformers the flexibility to learn latent connections between graph nodes that are not reflected in the adjacency structure (global-self attention).

While graph transformers can benefit from learning latent connectivity patterns which are not dictated by A, it is still beneficial to try and preserve some form of information regarding the connectivity of G. Such information can be integrated through a positional encoding (PE) scheme, where vertices are enriched with vectors denoting their position within the graph structure. Accordingly, quantum graph transformer 204 can implement graph structure, PE and message passing in a quantum context.

The two important features of graph transformation are seemingly counteracting requirements. First, it should facilitate all-to-all interactions of nodes in order to learn new edges, which means "forgetting" the actual graph connections. Second, preserving information of the original graph structure is important since the adjacency matrix is already available. Graph transformers fulfill the first feature with a global self-attention mechanism, such as that in equation (1). The second feature is then fulfilled by PE, which represent an encoding of the whole graph. Therefore, the quantum graph transformer 204 can implement these features via an encoding quantum circuit 212 which obeys edge connectivity and represents the structure of the graph and via a variational quantum circuit 214 that connects all possible nodes representing all-to-all interactions with learnable weights.

In an embodiment, quantum graph transformer 204 can build an encoding quantum circuit 212 based on the input graph to be classified, wherein the encoding quantum circuit receives as input qubits representing nodes of the graph and outputs a quantum graph state based on the qubits, wherein the quantum graph state serves as a quantum representation of the graph. For example, in encoding quantum circuit 212, the Hadamard gate (H) is applied to input qubits representing nodes of the graph, which are assumed prepared in the $|0\rangle$ state producing the superposition state $$|+\rangle = \frac{1}{\sqrt{2}}(|0\rangle + |1\rangle)$$

(e.g., computational basis change). Then controlled-Z gates are applied between qubits representing nodes that are connected in the graph. In the computational basis, the controlled-Z gate flips the phase of the target qubit if the control qubit is in the $|1\rangle$ state. The output quantum graph state then serves as the representation of the given graph. As controlled-Z gates are applied in the circuit in the same manner as edges in the input graph, the structure of the input graph is accurately represented by the output quantum graph state. For example, if nodes 0 and node 1 of the input graph are connected by an edge, then qubit 0 and qubit 1 can be connected by a controlled-Z gate within the encoding quantum circuit. It should be appreciated that as controlled-Z gates are utilized to model edges of the input graph, quantum graph transformer 204 can build an encoding quantum circuit that is unique to the input graph. Once the quantum graph transformer 204 has built an appropriate quantum encoding circuit 212, the encoding quantum circuit 212 can be executed on quantum hardware, such as quantum system 101, or on a quantum simulator.

In a further embodiment, quantum graph transformer 204 can select a variational quantum circuit 214 for use in the learning process. The variational quantum circuit 214 can be selected based on the number of nodes in the input graph. For example, once the encoding quantum circuit 212 has produced the output quantum graph state, the variational quantum circuit 214 can receive the quantum graph state as input and outputs a final quantum state and graph encodings. Variational quantum circuit 214 can comprise a parametrized quantum circuit (PQC) which enables all-to-all connectivity between qubits (e.g., each qubit is connected to every other qubit in the circuit via a gate). The connections between the qubits are implemented through a controlled-X gate between two qubits. In the computational basis, the controlled-X gate flips the target qubit if the control qubit is in the $|1\rangle$ state. In this sense, the controlled-X gate is similar to a classical XOR gate. The learnable entities of the input graph, akin to weight matrices, are represented by the angles of rotational gates around the Y axis:

$$RY(\theta) = \exp\left(-i\frac{\theta}{2}Y\right).$$

Variational quantum circuit 214 can comprise two series or sets of such rotational gates (R), one at each of the input (e.g., a first set) and output (e.g., a second set) sides of the circuit for a total of 2n learnable entities.

As part of the learning process, a training graph dataset consisting of k undirected, connected graphs $G_r(V_r, E_r)$, r=1, . . . , k, and a class label set of class labels $l_r$ can be utilized. A graph is then classified as belonging to a class of set $l_r$. The measurement of the output quantum state of variational quantum circuit 214 results in a vector of $2^n$ entries, wherein the jth entry denotes the probability to land to the corresponding configuration. The configuration can comprise a binary string label, and the parity of the string label can be computed determine the probability of the graph belonging to a class of the set of class labels $l_r$. Optimization component 210 can then update the first set of angles of rotations and the second set of angles of rotations (e.g., the learnable parameters) based on a function of measurements over the final quantum state (e.g., the predicted classification of the graph) and a supervisory signal (e.g., the actual or true classification of the graph). For example, given a graph and set of parameters, optimization component 210 can compute the negative log loss for the predicted classification probabilities against the true classification labels. The loss terms can then be averaged (e.g., binary cross entropy) over all graphs in the training dataset to produce the value of the loss function for a set of parameters. Optimization component 210 can then utilize an Adam optimizer, such as AMSGRAD, to learn parameters that decrease or minimize the loss function, and the variational quantum circuit 214 can be updated with the improved parameters. It should be appreciated that encoding quantum circuit 212 and/or variational quantum circuit 214 can be executed on quantum simulators, quantum hardware (e.g., quantum system 101) and/or any combination thereof. For example, in an embodiment, during the learning process, encoding quantum circuit 212 and variational quantum circuit 214 can be executed in a quantum simulator in order to learn the parameters that minimize loss, and then encoding quantum circuit 212 and variational quantum circuit 214 can be executed on quantum hardware using the learned parameters to perform actual classification tasks.

Figure 3:
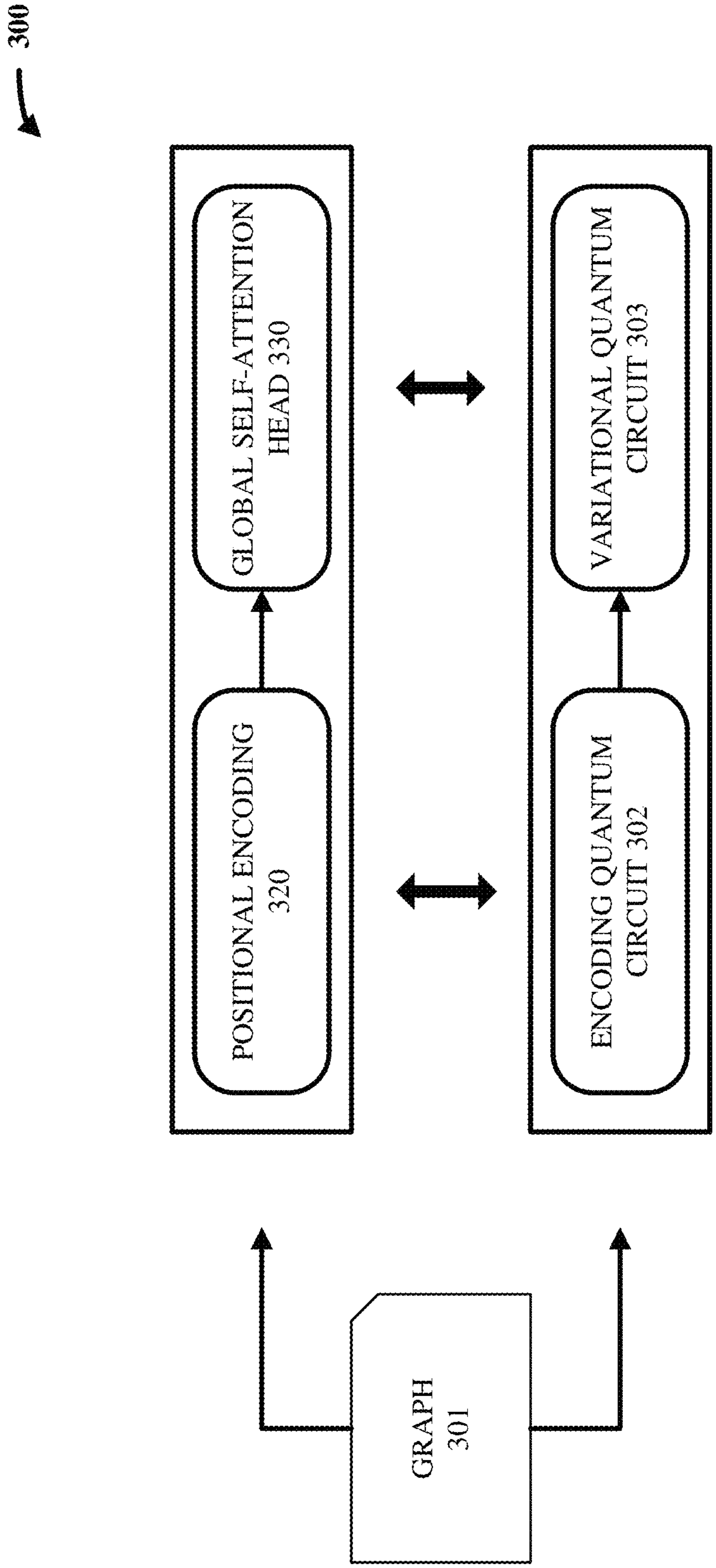
FIG. 3 illustrates a comparison of a quantum graph transformer process with a classical computing graph transformer process in accordance with one or more embodiments described herein.

FIG. 3 illustrates a comparison of a quantum graph transformer process with a classical computing graph transformer process. As shown in FIG. 3, a graph 301 is fed to encoding quantum circuit 302, and the output of encoding quantum circuit 302 is passed to variational quantum circuit 303. Accordingly, encoding quantum circuit 302 plays the same role as positional encoding 320 does in classical graph transformation. Similarly, variational quantum circuit 303 plays the same role as global self-attention head 330 does in classical graph transformation.

Figure 4:
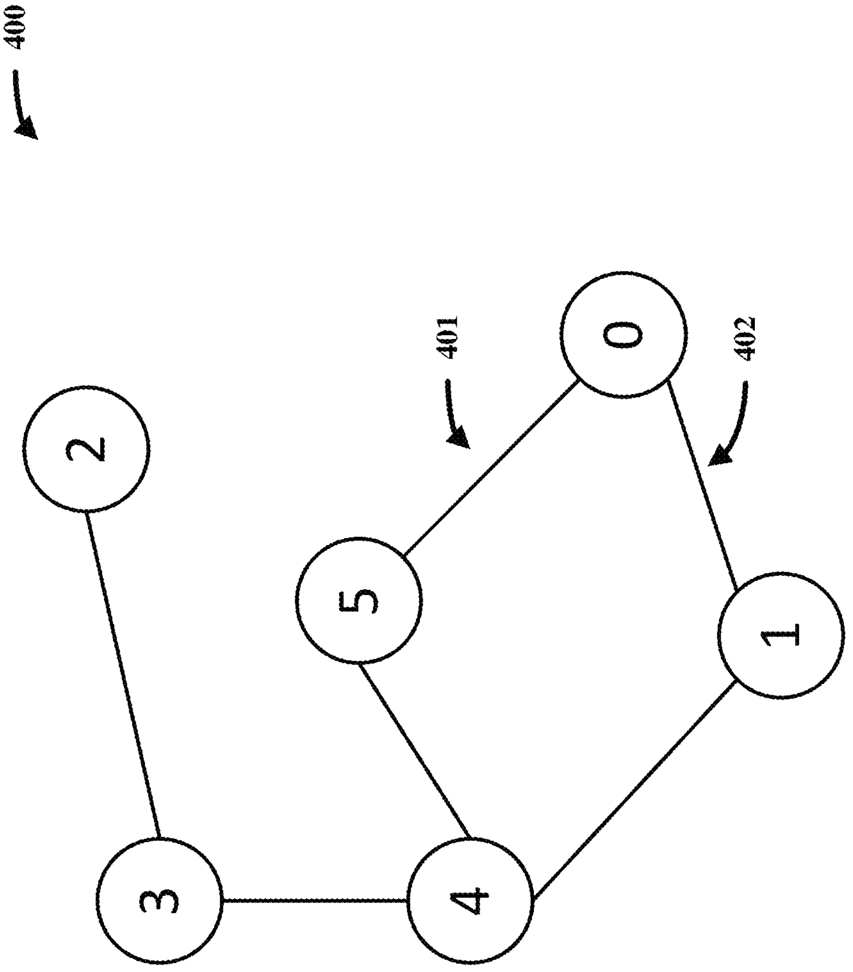
FIG. 4 illustrates an example undirected graph in accordance with one or more embodiments described herein.

FIG. 4 illustrates an example undirected graph 400 in accordance with one or more embodiments described herein.

As shown, graph 400 comprises nodes 0, 1, 2, 3, 4 and 5 and various edges connecting nodes such as edge 401 that connects nodes 0 and 5 and edge 402 that connects nodes 0 and 1. In one or more embodiments, a graph such as graph 400 can be utilized as input for the quantum graph transformer.

Figure 5:
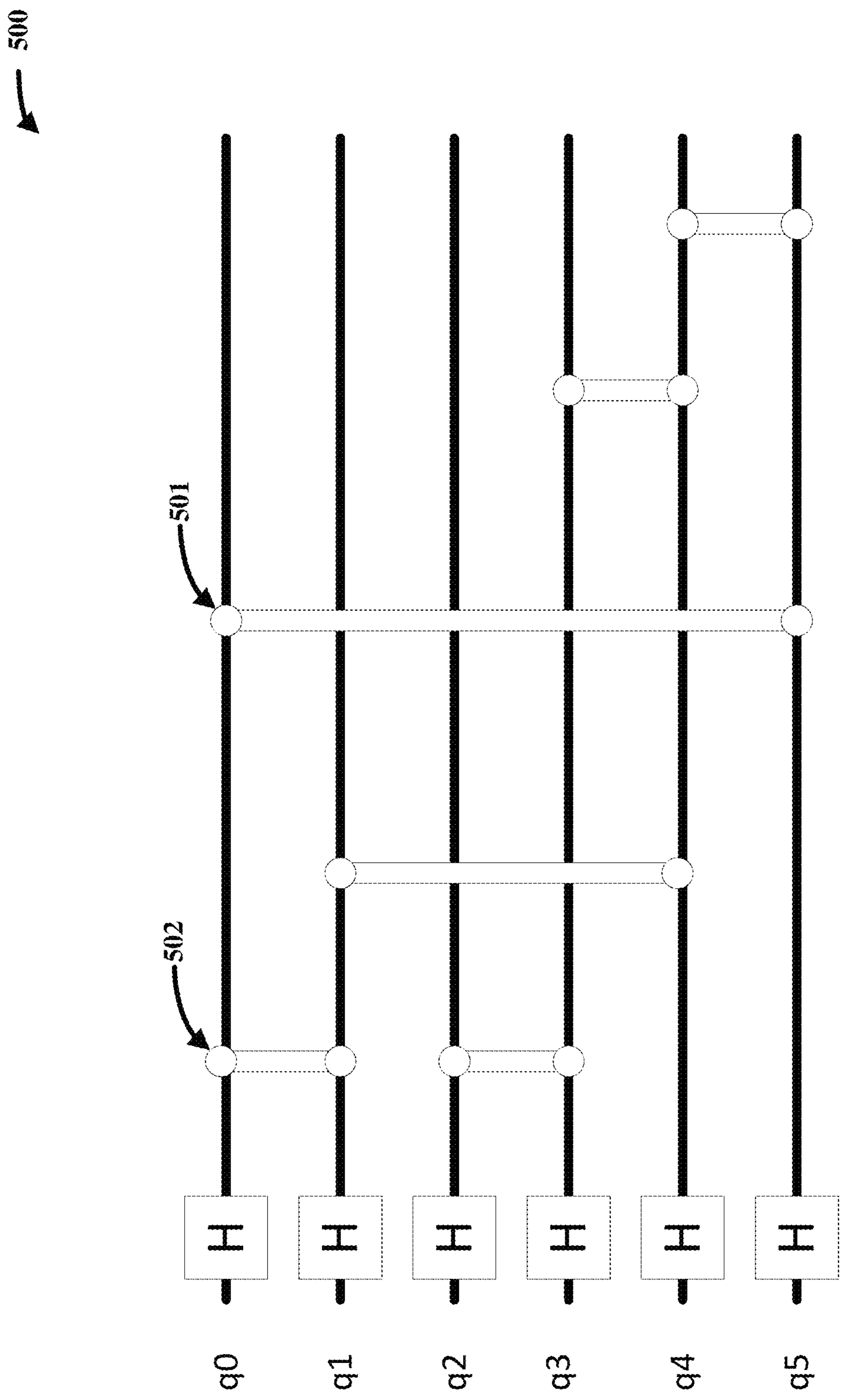
FIG. 5 illustrates an example encoding quantum circuit, in accordance with one or more embodiments described herein.

FIG. 5 illustrates an example encoding quantum circuit 500, in accordance with one or more embodiments described herein.

Encoding quantum circuit 500 can represent the positional encoding of graph 400. In encoding quantum circuit 500, the Hadamard gate (H) is applied to input qubits representing nodes of graph 300, which are assumed prepared in the $|0\rangle$ state producing the superposition state $$|+\rangle = \frac{1}{\sqrt{2}}(|0\rangle + |1\rangle)$$

(e.g., computational basis change). Then controlled-Z gates are applied between qubits representing nodes that are connected in the graph. In the computational basis, the controlled-Z gate flips the phase of the target qubit if the control qubit is in the $|1\rangle$ state. The output quantum graph state then serves as the representation of the given graph.

For example, encoding quantum circuit 500 comprises six qubits (q0, q1, q2, q3, q4 and q5) corresponding to nodes 0, 1, 2, 3, 4 and 5 of graph 400. As shown, a Hadamard gate (H) is applied to each qubit within encoding quantum circuit 500. Furthermore, controlled-Z gates are utilized to connect the qubits in the same manner that the edges of graph 400 connect nodes. For example, as node 0 is connected to node 5 by edge 401, q0 is connected to q5 by controlled-Z gate 501. Similarly, as node 0 is connected to node 1 by edge 402, q0 is connected to q1 by controlled-Z gate 502. It should be appreciated that the encoding quantum circuit 500 is specific to graph 400, as different graphs will have different combinations of nodes and edges, and thus different layouts of controlled-Z gates.

Figure 6:
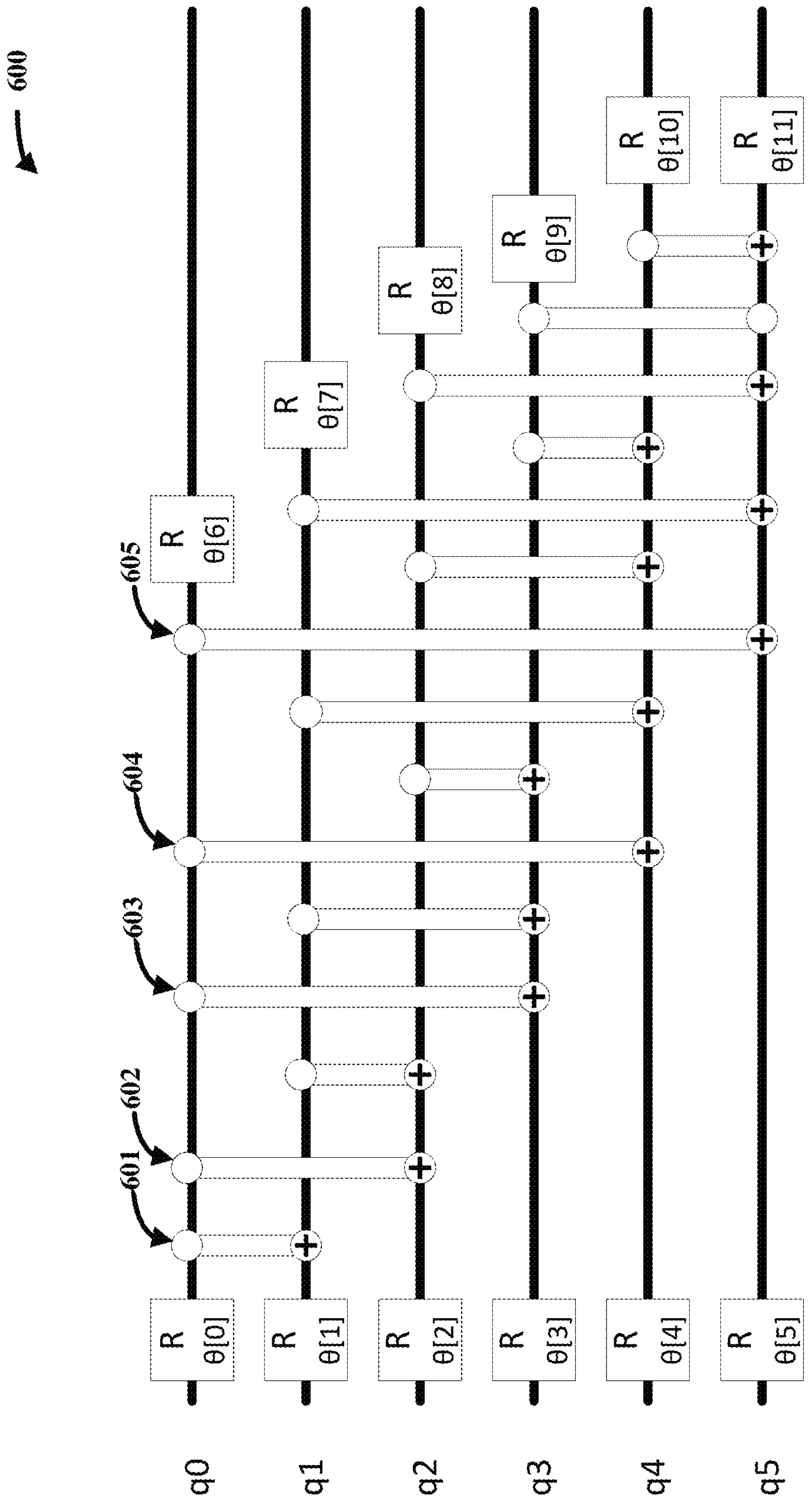
FIG. 6 illustrates an example variational quantum circuit in accordance with one or more embodiments described herein.

FIG. 6 illustrates an example variational quantum circuit 600 in accordance with one or more embodiments described herein.

Variational quantum circuit 600 is a parametrized quantum circuit (PQC) which enables all-to-all connectivity between qubits (e.g., each qubit is connected to every other qubit in the circuit via a gate). The connections between the qubits are implemented through a controlled-X gate between two qubits. In the computational basis, the controlled-X gate flips the target qubit if the control qubit is in the $|1\rangle$ state. In this sense, the controlled-X gate is similar to a classical XOR gate. The learnable entities of the graph 400, akin to weight matrices, are represented by the angles of rotational gates around the Y axis:

$$RY(\theta) = \exp\left(-i\frac{\theta}{2}Y\right).$$

Variational quantum circuit 600 comprises two series of such rotational gates (R), one at each of the input and output sides of the circuit for a total of 2n learnable entities.

For example, variational quantum circuit 600 is connected to the output of encoding quantum circuit 500 and comprises the six qubits (q0, q1, q2, q3, q4 and q5). As shown, a parameterized gate (R) is applied to each qubit, and then a series of controlled-X gates connect each qubit to every other qubit, enabling all-to-all connectivity. For example, gate 601 connects q0 and q1, gate 502 connects q0 and q2, gate 603 connects q0 and q3, gate 604 connects q0 and q4, and gate 605 connects q0 and q5. A second parameterized gate is then applied to each qubit after the all-to-all connectivity, to output a final quantum graph state and graph encodings. As shown, each parameterized gate comprises a different rotational parameter (e.g., θ[0] through θ[11]) for a total of 12 learnable entities.

Figure 7A:
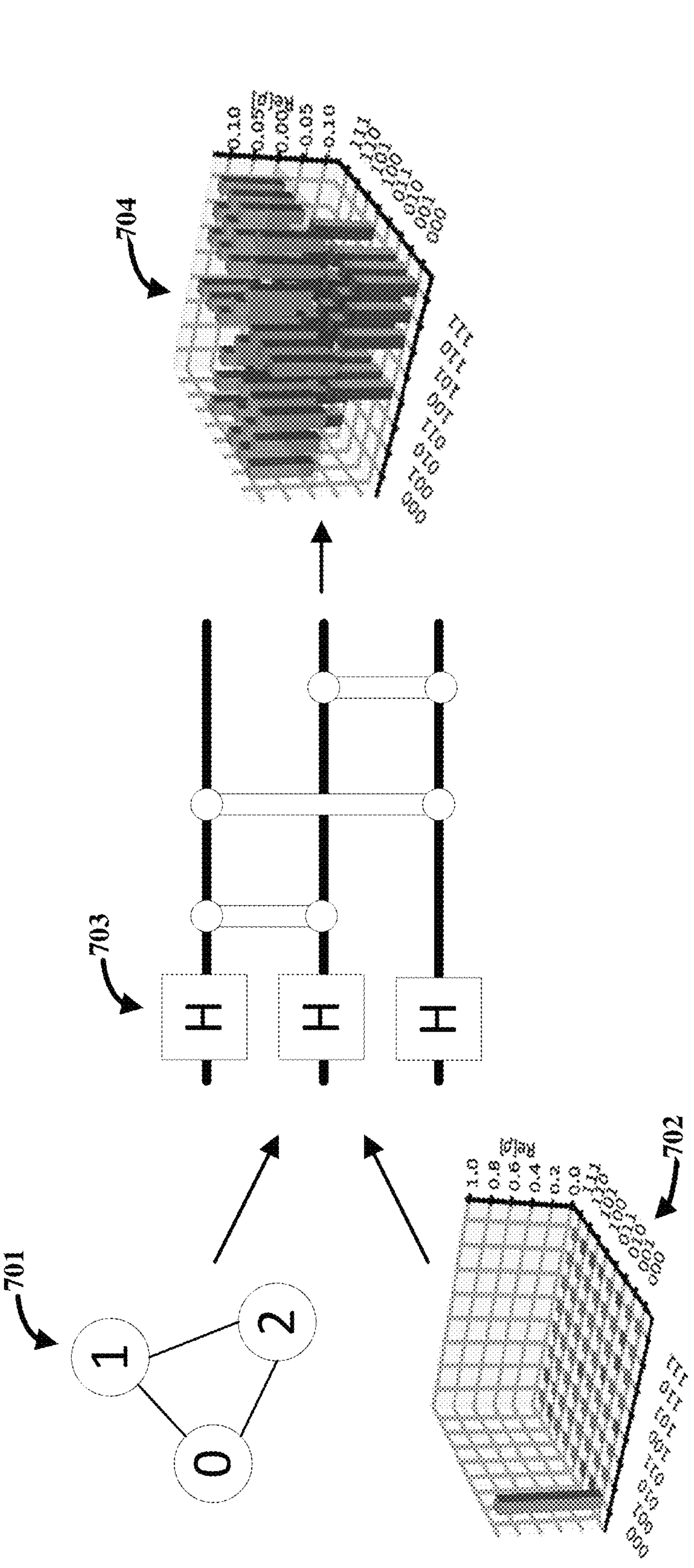
FIGS. 7A and 7B illustrate a flow diagram of a method for quantum graph learning in accordance with one or more embodiments described herein.
Figure 7B:
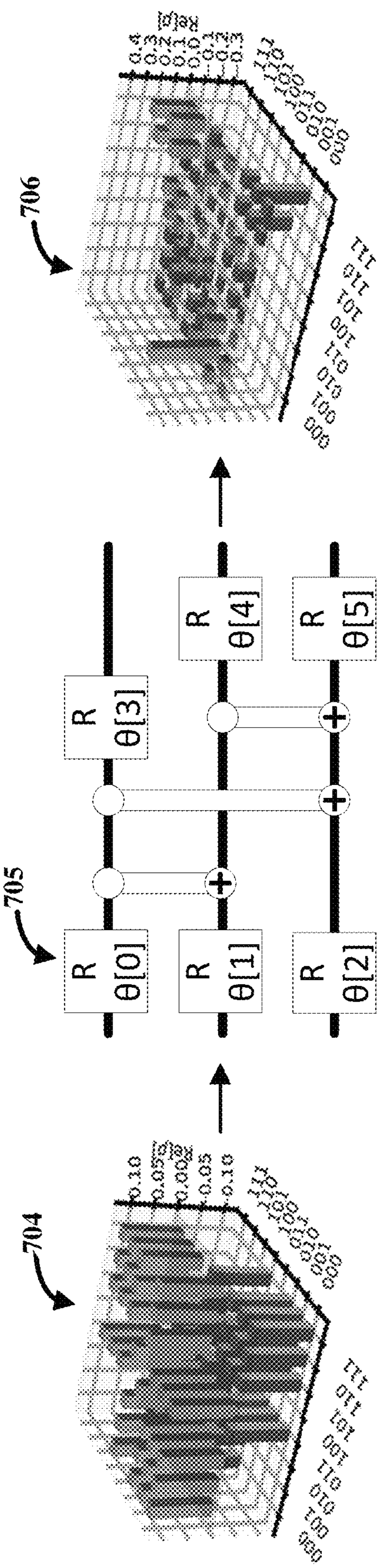

FIGS. 7A and 7B illustrate a flow diagram of a method for quantum graph learning in accordance with one or more embodiments described herein. As shown, in FIG. 7A input graph 701 is used to create encoding quantum circuit 703. Then the base state 702 of $|0\rangle^{\otimes 3}$ is prepared and then fed into encoding quantum circuit 703 to produce encoding state 704 (e.g., the quantum graph state). As shown in FIG. 7B, encoding state 704 is then fed to variational quantum circuit 705 which outputs final quantum state 706.

Figure 8:
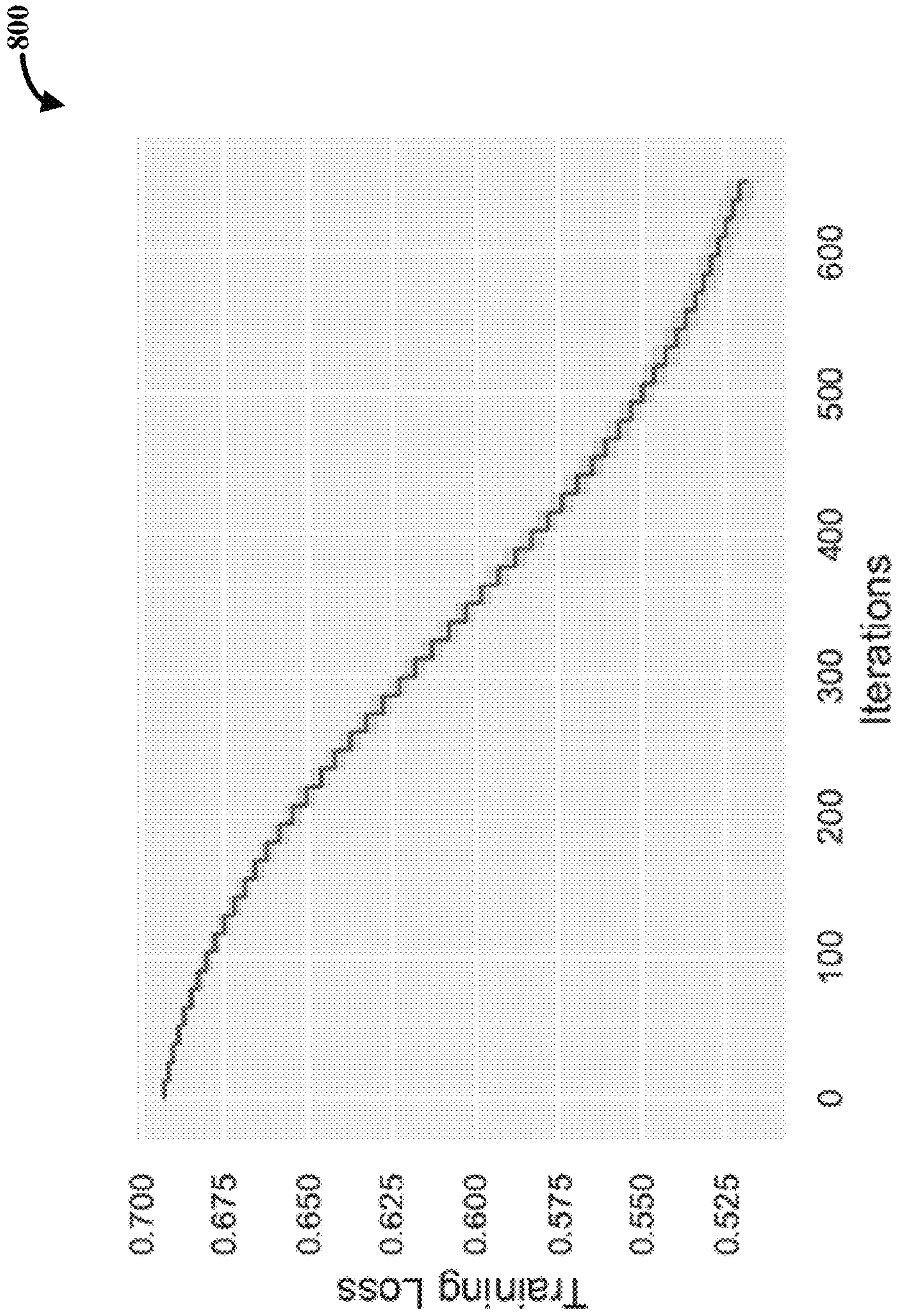
FIG. 8 illustrates a graph showing the decrease in training loss over the learning steps of a quantum graph transformer in accordance with one or more embodiments described herein.

FIG. 8 illustrates a graph 800 showing the decrease in training loss over the learning steps of a quantum graph transformer in accordance with one or more embodiments described herein.

Graph 800 illustrates the training loss across numerous iterations of a learning process associated with a quantum graph transformer. During the learning process, the measurement of the output state results in a vector of $2^n$ entries, wherein the jth entry denotes the probability to land on the corresponding configuration. An output configuration consists of a binary string label. The parity of the label (e.g., being either 0 or 1) is computed and agreement is made on accumulating its probability on class label 0 or 1. Accordingly, the probabilities of all output configurations with parity 0 are added together and their sum is considered to be the probability of getting classification label 0. For a given graph and set of parameters, the negative log loss for the predicted classification probabilities against the true classification label, also referred to herein as a supervisory signal, can be calculated. The average of these loss terms over all graphs and true classification labels of a dataset then gives the value of the loss function for the given parameters. Graph 800 shows the change in training loss over each learning iteration with training loss shown of the y-axis and iteration number shown on the x-axis. As shown, training loss decreases over iterations, thus showing that the learning process is working.

FIG. 9 illustrates a table 900 showing the accuracy of a quantum graph transformer before and after training in accordance with one or more embodiments described herein. Table 900 shows the initial average precision (e.g., before the learning process) and the learned average precision (e.g., after the parameters have been adjusted during learning) of quantum graph transformation performed on several different quantum processing units (QPU). As shown by table 900, the average precision improves during the training process, thus showing that the quantum graph transformer is learning effectively.

Figure 10:
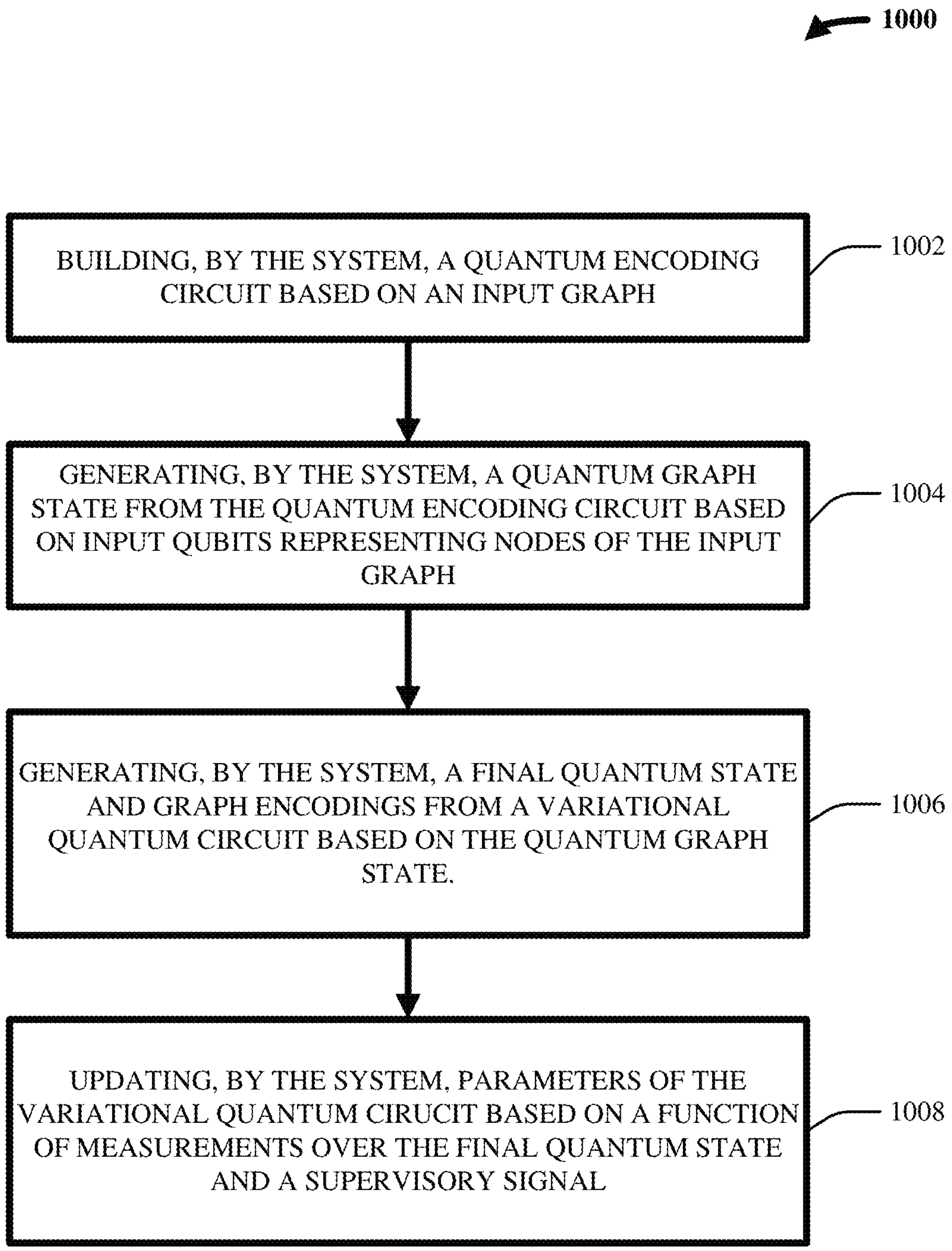
FIG. 10 illustrates a flow diagram of an example, non-limiting, computer-implemented method that can facilitate quantum graph transformation in accordance with one or more embodiments described herein.

FIG. 10 illustrates a flow diagram of an example, non-limiting, computer-implemented method 1000 that can facilitate quantum graph transformation in accordance with one or more embodiments described herein. Repetitive description of like elements employed in other embodiments described herein is omitted for sake of brevity.

At 1002, method 1000 can comprise building, by a system (e.g., quantum transformation system 102 and/or quantum graph transformer 204) operatively coupled to a processor (e.g., processor 206) a quantum encoding circuit based on an input graph. For example, as described above in greater detail in relation to FIG. 2, quantum graph transformer 204 can build a quantum encoding circuit wherein the Hadamard gate is applied to input qubits representing nodes of the input graph and controlled-Z gates applied between qubits representing nodes that are connected in the input graph. For example, if the input graph comprises an edge connecting node 0 and node 1 of the graph, then quantum graph transformer 204 can build a quantum encoding circuit comprising a controlled-Z gate applied to the qubit representing node 0 and the qubit representing node 1.

At 1004, method 1000 can comprise generating, by the system (e.g., quantum transformation system 102 and/or encoding quantum circuit 212), a quantum graph state from the quantum encoding circuit based on input qubits representing nodes of the input graph. For example, qubits representing nodes of the input graph can be prepared in the $|0\rangle$ state producing the superposition state $$|+\rangle = \frac{1}{\sqrt{2}}(|0\rangle + |1\rangle)$$

(e.g., computational basis change). In the computational basis, the controlled-Z gate flips the phase of the target qubit if the control qubit is in the $|1\rangle$ state. The output quantum graph state then serves as the representation of the given graph.

At 1006, method 1000 can comprise generating, by the system (e.g., quantum graph transformer system 202 and/or variational quantum circuit 214), a final quantum graph state and graph encodings from a variational quantum circuit based on the quantum graph state. For example, as described in detail above in reference to FIG. 3, the variational quantum circuit can receive the quantum graph state as input and outputs a final quantum state and graph encodings. The variational quantum circuit can comprise a parametrized quantum circuit (PQC) which enables all-to-all connectivity between qubits (e.g., each qubit is connected to every other qubit in the circuit via a gate). The connections between the qubits are implemented through a controlled-X gate between two qubits. In the computational basis, the controlled-X gate flips the target qubit if the control qubit is in the $|1\rangle$ state. In this sense, the controlled-X gate is similar to a classical XOR gate. The learnable entities of the input graph, akin to weight matrices, are represented by the angles of rotational gates around the Y axis:

$$RY(\theta) = \exp\left(-i\frac{\theta}{2}Y\right).$$

At 1008, method 1000 can comprise updating, by the system (e.g., quantum graph transformer system 202 and/or optimization component 210), parameters of the variational quantum circuit based a function of measurements over the final quantum state and a supervisory signal. For example, as described above in detail in reference to FIG. 2, given a graph and set of parameters, optimization component 210 can compute the negative log loss for the predicted classification probabilities against the true classification labels. The loss terms can then be averaged (e.g., binary cross entropy) over all graphs in the training dataset to produce the value of the loss function for a set of parameters. Optimization component 210 can then utilize an Adam optimizer, such as AMSGRAD, to learn parameters that decrease or minimize the loss function, and the variational quantum circuit 214 can be updated with the improved parameters.

Figure 11:
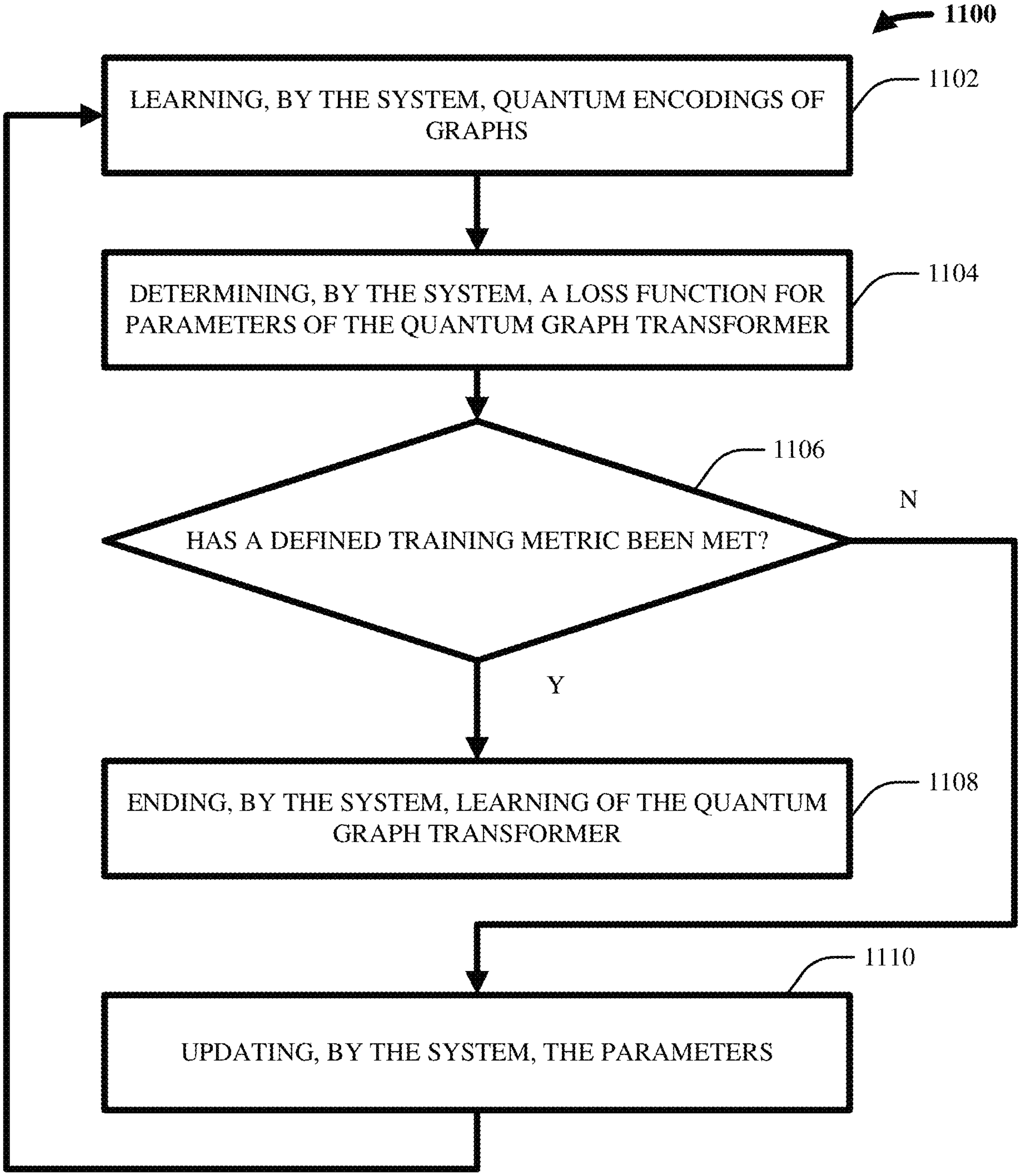
FIG. 11 illustrates a flow diagram of an example, non-limiting, computer-implemented method that can facilitate quantum graph transformation in accordance with one or more embodiments described herein.

FIG. 11 illustrates a flow diagram of an example, non-limiting, computer-implemented method 1100 that can facilitate quantum graph transformation in accordance with one or more embodiments described herein. Repetitive description of like elements employed in other embodiments described herein is omitted for sake of brevity.

At 1102, method 1100 can comprise learning, by a system (e.g., quantum transformation system 102 and/or quantum graph transformer 204) operatively coupled to a processor (e.g., processor 206) quantum encodings of input graphs. For example, as described above in reference to FIG. 2, a quantum graph transformer can learn quantum encodings of a graph through a quantum encoding circuit and a variational quantum circuit.

At 1104, method 1100 can comprise determining, by the system (e.g., quantum transformation system 102 and/or optimization component 210), a loss function for parameters of the quantum graph transformer. For example, as described above in greater detail in reference to FIG. 2, given a graph and set of parameters, optimization component 210 can compute the negative log loss for the predicted classification probabilities against the true classification labels. The loss terms can then be averaged (e.g., binary cross entropy) over all graphs in the training dataset to produce the value of the loss function for a set of parameters.

At 1106, method 1100 can comprise determining, by the system (e.g., quantum transformation system 102 and/or optimization component 210), if a defined training metric has been met. For example, the defined training metric can comprise a loss function value, an accuracy level of the quantum graph transformer, a defined number of training cycles, a defined amount of training time, and/or another metric. If the defined training metric has been met and/or exceeded, then method 1100 can proceed to step 1108 and end the learning process. If the defined training metric is not met, then method 1100 can proceed to step 1110 and optimization component 210 can update the parameters of the variational quantum circuit to minimize the loss function. Method 1100 can then return to step 1102 to continue the training process.

A practical application of quantum graph transformer system 202 is that it allows for graph transformation classification utilizing quantum computing hardware. For example, by enabling usage of quantum hardware for graph analysis, quantum graph transformer system 202 enables faster analysis of graphs, more accurate analysis of graphs, and/or analysis of more complex graphs than is capable with strictly classical computing systems.

It is to be appreciated that quantum graph transformer system 202 can utilize various combination of electrical components, mechanical components, and circuity that cannot be replicated in the mind of a human or performed by a human as the various operations that can be executed by quantum graph transformer system 202 and/or components thereof as described herein are operations that are greater than the capability of a human mind. For instance, the amount of data processed, the speed of processing such data, or the types of data processed by quantum graph transformer system 202 over a certain period of time can be greater, faster, or different than the amount, speed, or data type that can be processed by a human mind over the same period of time. According to several embodiments, quantum graph transformer system 202 can also be fully operational towards performing one or more other functions (e.g., fully powered on, fully executed, and/or another function) while also performing the various operations described herein. It should be appreciated that such simultaneous multi-operational execution is beyond the capability of a human mind. It should be appreciated that quantum graph transformer system 202 can include information that is impossible to obtain manually by an entity, such as a human user. For example, the type, amount, and/or variety of information included in quantum graph transformer system 202, such as quantum states of qubits, can be more complex than information obtained manually by an entity, such as a human user.

Figure 12:
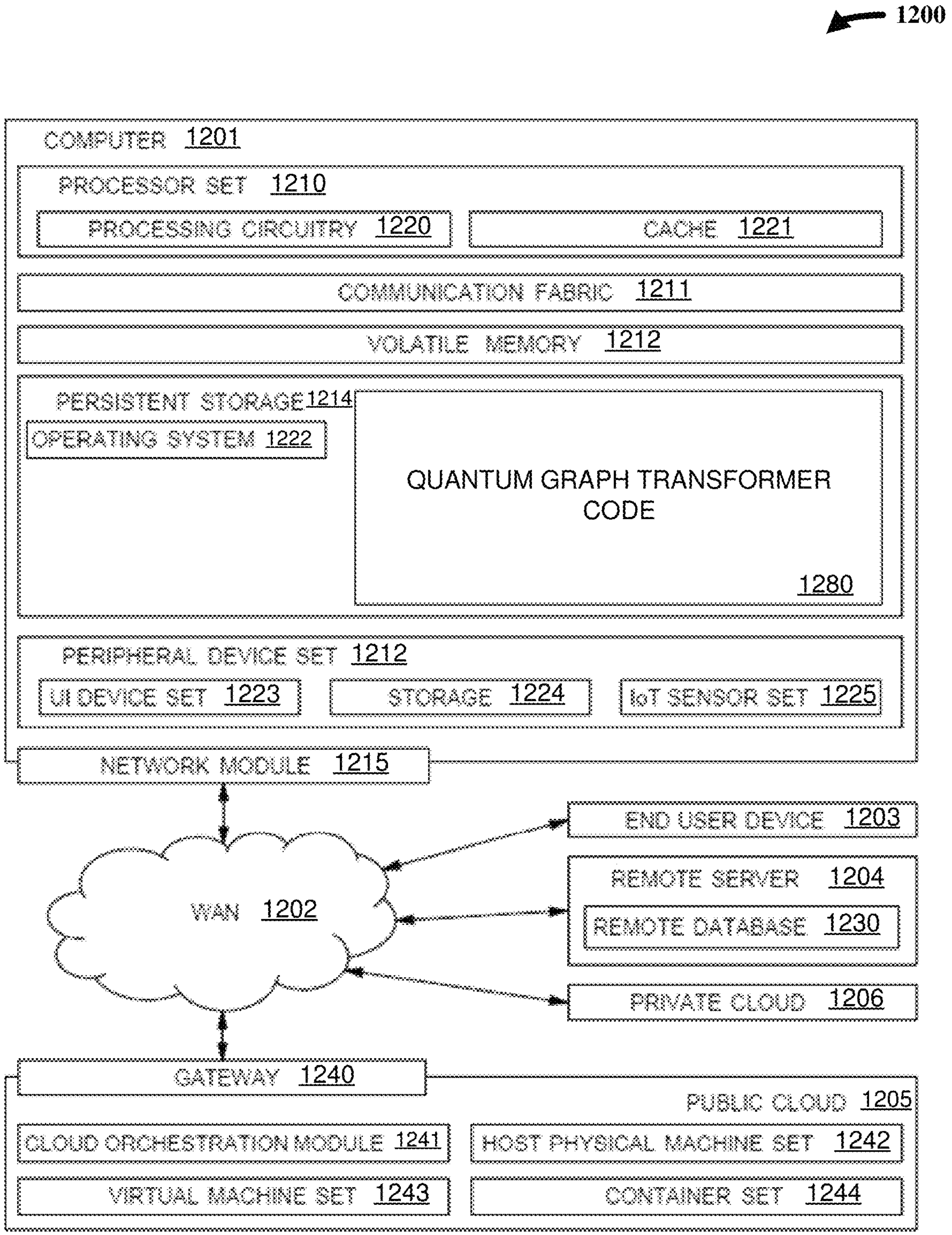
FIG. 12 illustrates an example, non-limiting environment for the execution of at least some of the computer code in accordance with one or more embodiments described herein.

FIG. 12 and the following discussion are intended to provide a brief, general description of a suitable computing environment 1200 in which one or more embodiments described herein at FIGS. 1-11 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1200 contains an example of an environment for the execution of at least some of the computer code involved in performing the inventive methods, such as translation of an original source code based on a configuration of a target system by the quantum graph transformer code 1280. In addition to block 1280, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 1280, as identified above), peripheral device set 1214 (including user interface (UI), device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method can be distributed among multiple computers and/or between multiple locations. On the other hand, in this presentation of computing environment 1200, detailed discussion is focused on a single computer, specifically computer 1201, to keep the presentation as simple as possible. Computer 1201 can be located in a cloud, even though it is not shown in a cloud in FIG. 12. On the other hand, computer 1201 is not required to be in a cloud except to any extent as can be affirmatively indicated.

PROCESSOR SET 1210 includes one, or more, computer processors of any type now known or to be developed in the future. Processing circuitry 1220 can be distributed over multiple packages, for example, multiple, coordinated integrated circuit chips. Processing circuitry 1220 can implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set can be located "off chip." In some computing environments, processor set 1210 can be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods can be stored in block 1280 in persistent storage 1213.

COMMUNICATION FABRIC 1211 is the signal conduction path that allows the various components of computer 1201 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, the volatile memory is characterized by random access, but this is not required unless affirmatively indicated. In computer 1201, the volatile memory 1212 is located in a single package and is internal to computer 1201, but, alternatively or additionally, the volatile memory can be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 can be a read only memory (ROM), but typically at least a portion of the persistent storage allows writing of data, deletion of data and re-writing of data. Some familiar forms of persistent storage include magnetic disks and solid-state storage devices. Operating system 1222 can take several forms, such as various known proprietary operating systems or open-source Portable Operating System Interface type operating systems that employ a kernel. The code included in block 1280 typically includes at least some of the computer code involved in performing the inventive methods.

PERIPHERAL DEVICE SET 1214 includes the set of peripheral devices of computer 1201. Data communication connections between the peripheral devices and the other components of computer 1201 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1223 can include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 can be persistent and/or volatile. In some embodiments, storage 1224 can take the form of a quantum computing storage device for storing data in the form of qubits. In embodiments where computer 1201 is required to have a large amount of storage (for example, where computer 1201 locally stores and manages a large database) then this storage can be provided by peripheral storage devices designed for storing large amounts of data, such as a storage area network (SAN) that is shared by multiple, geographically distributed computers. IoT sensor set 1225 is made up of sensors that can be used in Internet of Things applications. For example, one sensor can be a thermometer and another sensor can be a motion detector.

NETWORK MODULE 1215 is the collection of computer software, hardware, and firmware that allows computer 1201 to communicate with other computers through WAN 1202. Network module 1215 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201) and can take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 can be a client device, such as thin client, heavy client, mainframe computer and/or desktop computer.

REMOTE SERVER 1204 is any computer system that serves at least some data and/or functionality to computer 1201. Remote server 1204 can be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data can be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs can be stored as images and can be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware and firmware allowing public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud. The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Figure 13:
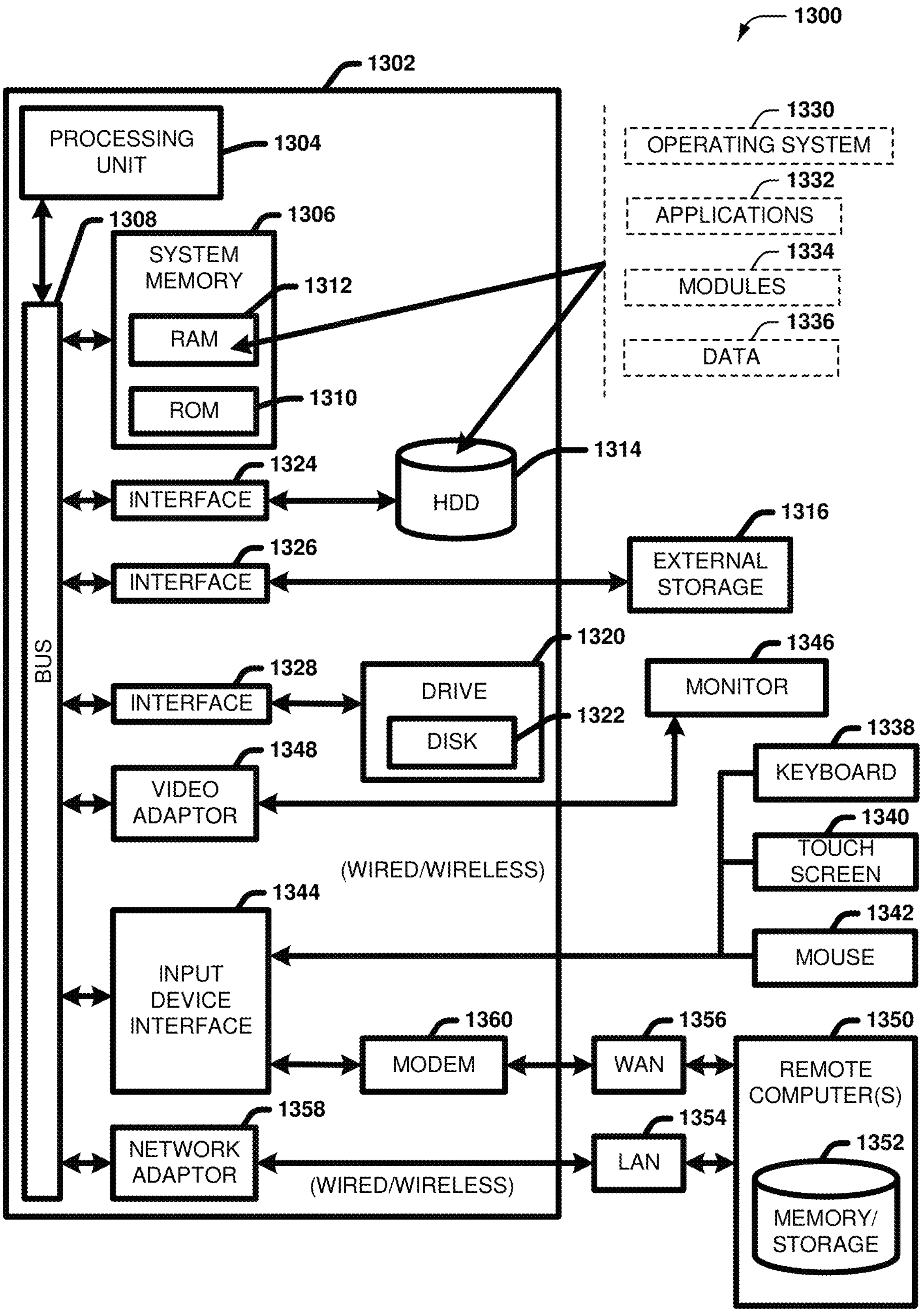
FIG. 13 illustrates a block diagram of an example, non-limiting operating environment in which one or more embodiments described herein can be facilitated.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity.

With reference to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1310, a memory stick or flash drive reader, a memory card reader, etc.) and a drive 1320, e.g., such as a solid state drive, an optical disk drive, which can read or write from a disk 1322, such as a CD-ROM disc, a DVD, a BD, etc. Alternatively, where a solid state drive is involved, disk 1322 would not be included, unless separate. While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and drive 1320 can be connected to the system bus 1308 by an HDD interface 1324, an external storage interface 1326 and a drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above, such as but not limited to a network virtual machine providing one or more aspects of storage or processing of information. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer-implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system comprising:

a memory that stores computer executable components;

a processor that executes computer executable components stored in the memory, wherein the computer executable components comprise:

a quantum graph transformer that learns a quantum encoding of a graph, wherein the learning comprises:

generating a quantum graph state from an encoding quantum circuit based on qubits representing nodes of the graph, wherein the quantum graph state serves as quantum representation of the graph; and generating a final quantum state and graph encodings from a variational quantum circuit based on the quantum graph state, wherein the variational quantum circuit comprises a first set of parameterized rotational gates, a set of controlled-X gates and a second set of parameterized rotational gates, wherein the set of controlled-X gates connect all pairs of qubits.

2. The system of claim 1, wherein the encoding quantum circuit comprises Hadamard gates, wherein the Hadamard gates are applied on the qubits.

3. The system of claim 2, wherein the encoding quantum circuit further comprises a set of controlled-Z gates that are applied on pairs of the qubits representing nodes that are connected in the graph and produce the quantum graph state.

4. The system of claim 1, wherein different encoding quantum circuits are utilized for different graphs.

5. The system of claim 1, wherein parameters of the first set of parametrized rotational gates comprise a first set of angles of rotations and parameters of the second set of parametrized rotational gates comprise a second set of angles of rotations.

6. The system of claim 5, further comprising:

an optimization component that updates the first set of angles of rotations and the second set of angles of rotations based on a function of measurements over the final quantum state and a supervisory signal.

7. A computer-implemented method comprising:

learning, by a system operatively coupled to a processor, a quantum encoding of a graph, wherein the learning comprises:

generating, by the system, a quantum graph state from an encoding quantum circuit based on qubits representing nodes of the graph, wherein the quantum graph state serves as quantum representation of the graph; and generating, by the system, a final quantum state and graph encodings from a variational quantum circuit based on the quantum graph state, wherein the variational quantum circuit comprises a first set of parameterized rotational gates, a set of controlled-X gates and a second set of parameterized rotational gates, wherein the set of controlled-X gates connect all pairs of qubits.

8. The computer-implemented method of claim 7, wherein the encoding quantum circuit comprises Hadamard gates, wherein the Hadamard gates are applied on the qubits.

9. The computer-implemented method of claim 8, wherein the encoding quantum circuit further comprises a set of controlled-Z gates that are applied on pairs of the qubits representing nodes that are connected in the graph and produce the quantum graph state.

10. The computer-implemented method of claim 7, wherein parameters of the first set of parametrized rotational gates comprise a first set of angles of rotations and parameters of the second set of parametrized rotational gates comprise a second set of angles of rotations.

11. The computer-implemented method of claim 10, wherein the learning further comprises updating, by the system, the first set of angles of rotations and the second set of angles of rotations based on a function of measurements over the final quantum state and a supervisory signal.

12. The computer-implemented method of claim 7, wherein different encoding quantum circuits are utilized for different graphs.

13. A computer program product, comprising a computer readable storage medium having program instructions embodied therewith, the program instructions executable by a processor to cause the processor to:

learn, by the processor, a quantum encoding of a graph, wherein the learning causes the processor to:

generate, by the processor, a quantum graph state from an encoding quantum circuit based on qubits representing nodes of the graph, wherein the quantum graph state serves as quantum representation of the graph; and generate, by the processor, a final quantum state and graph encodings from a variational quantum circuit based on the quantum graph state, wherein the variational quantum circuit comprises a first set of parameterized rotational gates, a set of controlled-X gates and a second set of parameterized rotational gates, wherein the set of controlled-X gates connect all pairs of qubits.

14. The computer program product of claim 13, wherein the encoding quantum circuit comprises Hadamard gates, wherein the Hadamard gates are applied on the qubits.

15. The computer program product of claim 14, wherein the encoding quantum circuit further comprises a set of controlled-Z gates that are applied on pairs of the qubits representing nodes that are connected in the graph and produce the quantum graph state.

16. The computer program product of claim 13, wherein the program instructions are further executable by the processor, to cause the processor to:

update, by the processor, the first set of parameterized rotational gates and the second set of parameterized rotational gates based on a function of measurements over the final quantum state and a supervisory signal.

17. The computer program product of claim 13, wherein different encoding quantum circuits are utilized for different graphs.

18. A computer-implemented method comprising:

building, by a system operatively coupled to a processor, a quantum encoding circuit based on an input graph;

generating, by the system, a quantum graph state from the quantum encoding circuit based on input qubits representing nodes of the input graph;

generating, by the system, a final quantum state and graph encodings from a variational quantum circuit based on the quantum graph state, wherein the variational quantum circuit comprises a first set of parameterized rotational gates, a set of controlled-X gates and a second set of parameterized rotational gates, wherein the set of controlled-X gates connect all pairs of qubits; and updating, by the system, parameters of the variational quantum circuit based on a function of measurements over the final quantum state and a supervisory signal.

19. A computer program product, comprising a computer readable storage medium having program instructions embodied therewith, the program instructions executable by a processor to cause the processor to:

build, by the processor, a quantum encoding circuit based on an input graph;

generate, by the processor, a quantum graph state from the quantum encoding circuit based on input qubits representing nodes of the input graph;

generate, by the processor, a final quantum state and graph encodings from a variational quantum circuit based on the quantum graph state, wherein the variational quantum circuit comprises a first set of parameterized rotational gates, a set of controlled-X gates and a second set of parameterized rotational gates, wherein the set of controlled-X gates connect all pairs of qubits; and update, by the processor, parameters of the variational quantum circuit based on a function of measurements over the final quantum state and a supervisory signal.

* * * * *